United States Patent
Woyciesjes et al.

(10) Patent No.: US 10,771,004 B2
(45) Date of Patent: Sep. 8, 2020

(54) SYSTEM AND METHOD FOR INSTALLATION AND VERIFICATION OF FASTENERS

(71) Applicant: Newfrey LLC, New Britain, CT (US)

(72) Inventors: Jim Woyciesjes, Danbury, CT (US); Mikel Ezcurra, Danbury, CT (US); Zack Z. Qu, Danbury, CT (US)

(73) Assignee: Newfrey LLC, New Britain, CT (US)

( * ) Notice: Subject to any disclaimer, the term of this patent is extended or adjusted under 35 U.S.C. 154(b) by 0 days.

(21) Appl. No.: 16/558,358

(22) Filed: Sep. 3, 2019

(65) Prior Publication Data

US 2019/0386600 A1 Dec. 19, 2019

Related U.S. Application Data

(63) Continuation of application No. 16/022,778, filed on Jun. 29, 2018, now Pat. No. 10,483,901.

(Continued)

(51) Int. Cl.
*H02P 29/00* (2016.01)
*B23B 45/02* (2006.01)
(Continued)

(52) U.S. Cl.
CPC ........ *H02P 29/0027* (2013.01); *B21J 15/022* (2013.01); *B21J 15/26* (2013.01);
(Continued)

(58) Field of Classification Search
CPC ...... H02P 29/00; H02P 29/0027; H02P 29/40; H02P 1/00; H02P 1/04; H02P 1/24;
(Continued)

(56) References Cited

U.S. PATENT DOCUMENTS

| 4,418,765 A | 12/1983 | Mod et al. |
| 5,014,793 A | 5/1991 | Germanton et al. |

(Continued)

FOREIGN PATENT DOCUMENTS

| DE | 102005054048 A1 | 5/2007 |
| DE | 102007059422 A1 | 6/2009 |

(Continued)

*Primary Examiner* — Antony M Paul
(74) *Attorney, Agent, or Firm* — Harness, Dickey & Pierce, P.L.C.

(57) ABSTRACT

A method is presented for operating a power tool during installation of a deformable fastener. The method includes: receiving measures of current supplied to a motor of the power tool during operation of the power tool; determining rate of change of the current during operation of the power tool; determining occurrence of the power tool engaging the fastener based on the magnitude of the current supplied to the motor; determining occurrence of the power tool swaging the fastener based on the rate of change of the current; determining completion of the power tool swaging the fastener based on the magnitude of the current and the rate of change of the current; and verifying quality of the installation of the fastener using the determination of the occurrence of the power tool engaging the fastener and the determination of the completion of the power tool swaging the fastener.

19 Claims, 7 Drawing Sheets

Related U.S. Application Data

(60) Provisional application No. 62/530,665, filed on Jul. 10, 2017.

(51) Int. Cl.
    *H02P 29/40*     (2016.01)
    *B21J 15/02*     (2006.01)
    *B21J 15/28*     (2006.01)
    *B21J 15/26*     (2006.01)

(52) U.S. Cl.
    CPC .............. *B21J 15/285* (2013.01); *B23B 45/02* (2013.01); *H02P 29/40* (2016.02)

(58) Field of Classification Search
    CPC .... H02P 1/18; H02P 1/26; H02P 1/423; H02P 1/46; B23B 45/02; B21J 15/022; B21J 15/28; B25F 5/001; B25B 23/147; G05B 15/02; B21K 1/44; B21K 1/56; B21K 1/707; B21K 1/64; B23G 1/00; B21G 3/00
    USPC .......... 318/400.01, 700, 701, 727, 779, 799, 318/800, 801; 72/31.08, 803, 10.2; 228/140, 173.2; 470/6, 27, 48, 57, 87, 470/110, 208
    See application file for complete search history.

(56) References Cited

U.S. PATENT DOCUMENTS

| | | | |
|---|---|---|---|
| 5,353,882 A | 10/1994 | Inoue et al. | |
| 5,655,289 A | 8/1997 | Wille et al. | |
| 5,657,417 A | 8/1997 | Di Troia | |
| 5,666,710 A | 9/1997 | Weber et al. | |
| 7,062,979 B2 | 6/2006 | Day et al. | |
| 7,331,406 B2 | 2/2008 | Wottreng, Jr. et al. | |
| RE41,160 E | 3/2010 | Gilmore et al. | |
| RE41,185 E | 3/2010 | Gilmore et al. | |
| 7,788,780 B2 | 9/2010 | King | |
| 7,802,352 B2 | 9/2010 | Chitty et al. | |
| 7,936,140 B2 | 5/2011 | Wei | |
| 8,443,512 B2 | 5/2013 | Masugata | |
| 8,529,567 B2 | 9/2013 | Garcia et al. | |
| 8,881,842 B2 * | 11/2014 | Borinato | B23P 19/066 173/1 |
| 8,919,456 B2 | 12/2014 | Ng et al. | |
| 9,079,240 B2 | 7/2015 | Schiffler et al. | |
| 9,193,055 B2 * | 11/2015 | Lim | B25F 5/001 |
| 9,440,340 B2 | 9/2016 | Hsu et al. | |
| 9,645,026 B2 | 5/2017 | Fujimoto et al. | |
| 9,707,671 B2 | 7/2017 | Shi | |
| 2005/0131415 A1 | 6/2005 | Hearn et al. | |
| 2006/0157262 A1 | 7/2006 | Chen | |
| 2011/0036214 A1 | 2/2011 | Potterfield | |
| 2013/0068491 A1 | 3/2013 | Kusakawa et al. | |
| 2013/0327552 A1 | 12/2013 | Lovelass et al. | |
| 2014/0367134 A1 | 12/2014 | Phillips et al. | |
| 2015/0122522 A1 | 5/2015 | Fujimoto et al. | |
| 2015/0336248 A1 | 11/2015 | Goe | |
| 2016/0031072 A1 * | 2/2016 | Lim | B25F 5/001 173/178 |
| 2016/0045950 A1 | 2/2016 | Gaertner et al. | |
| 2016/0215808 A1 * | 7/2016 | Brewer | B21J 15/022 |
| 2016/0354888 A1 | 12/2016 | Huber et al. | |

FOREIGN PATENT DOCUMENTS

| | | |
|---|---|---|
| EP | 1382406 A2 | 1/2004 |
| EP | 3141317 A1 | 3/2017 |

\* cited by examiner

SYSTEM AND METHOD FOR INSTALLATION AND VERIFICATION OF FASTENERS

CROSS-REFERENCE TO RELATED APPLICATIONS

This application is a continuation of U.S. patent application Ser. No. 16/022,778 filed on Jun. 29, 2018, which claims the benefit of U.S. Provisional Application No. 62/530,665 filed on Jul. 10, 2017. The entire disclosures of each of the above applications are incorporated herein by reference.

FIELD

The present disclosure relates to power tools and systems and methods related to the control of power tools during the installation of fasteners.

BACKGROUND

Many power tools, such as drills, drivers, and fastening tools, have a mechanical clutch that interrupts power transmission to the output spindle when the output torque exceeds a threshold value of a maximum torque. Such a clutch is a purely mechanical device that breaks a mechanical connection in the transmission to prevent torque from being transmitted from the motor to the fastening mechanism of the tool, such as a spindle or a pulling mechanism. The maximum torque or maximum pull force threshold value may be user adjustable, often by a clutch collar that is attached to the tool between the tool and the tool holder or chuck. The user may rotate the clutch collar among a plurality of different positions for different maximum torque settings. The components of mechanical clutches tend to wear over time, and add excessive bulk and weight to a tool.

Some power tools additionally or alternatively include an electronic clutch. Such a clutch electronically senses the output torque or output force (e.g., via a transducer) or infers the output torque or output force (e.g., by sensing another parameter such as current drawn by the motor). When the electronic clutch determines that the sensed output torque exceeds a threshold value, it interrupts or reduces power transmission to the output, either mechanically (e.g., by actuating a solenoid to break a mechanical connection in the transmission) or electrically (e.g., by interrupting or reducing current delivered to the motor, and/or by actively braking the motor). Existing electronic clutches tend to be overly complex and/or inaccurate and fail to include a method by which a user can verify if the installed fastener has been installed correctly.

This section provides background information related to the present disclosure which is not necessarily prior art.

SUMMARY

This section provides a general summary of the disclosure, and is not a comprehensive disclosure of its full scope or all of its features.

In one aspect of the present disclosure, a method is presented for operating a power tool during installation of a deformable fastener. The power tool may include a collet for grasping the fastener and a drivable sliding sleeve with an anvil for swaging the fastener. The method includes: receiving measures of current supplied to a motor of the power tool during operation of the power tool; determining rate of change of the current during operation of the power tool; determining occurrence of the power tool engaging the fastener based on the magnitude of the current supplied to the motor; determining occurrence of the power tool swaging the fastener based on the rate of change of the current; determining completion of the power tool swaging the fastener based on the magnitude of the current and the rate of change of the current; and verifying quality of the installation of the fastener using the determination of the occurrence of the power tool engaging the fastener and the determination of the completion of the power tool swaging the fastener.

Upon determining that the swaging of fastener is complete, the rotation of the motor is altered (e.g., reversing or stopping rotation of the motor). Additionally or alternatively, an indicator for the quality of the installation of the fastener is generated by the power tool. The indicator for the quality of the installation of the fastener may be presented to a tool operator, stored in a data store and/or transmitted via a transceiver over a wireless network.

In one embodiment, the occurrence of the power tool swaging the fastener is determined by comparing magnitude of the rate of change of the current to a first rate of change threshold. The completion of the power tool swaging is determined by comparing the magnitude of the current to a second current threshold and comparing magnitude of the rate of change of the current to a second rate of change threshold, where the second current threshold is larger than the first current threshold and the second rate of change threshold is larger than the first rate of change threshold.

The quality of the installation of the fastener can be verified by determining a distance traversed by the sliding sleeve during swaging of the fastener, comparing the distance traversed by the sliding sleeve to known dimensions of the fastener, and generating the indicator for the quality of the installation of the fastener based on the comparison.

Advantages may include one or more of the following. The clutch control system enables the use of the power tool with a wide variety of fastener materials, fasteners of various material properties and fasteners with various modes of connection. Further, the clutch control system provides a method of verifying and providing feedback that a fastener has been properly installed. The system and related methodology can also provide feedback regarding other possible faults or failures that may occur during a fastening process or that may occur within the power tool itself. These and other advantages and features will be apparent from the description and the drawings.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 a side view of an example tool in accordance with the present disclosure.

Corresponding reference numerals indicate corresponding parts throughout the several views of the drawings.

DETAILED DESCRIPTION

Example embodiments will now be described more fully with reference to the accompanying drawings.

Figure 1:
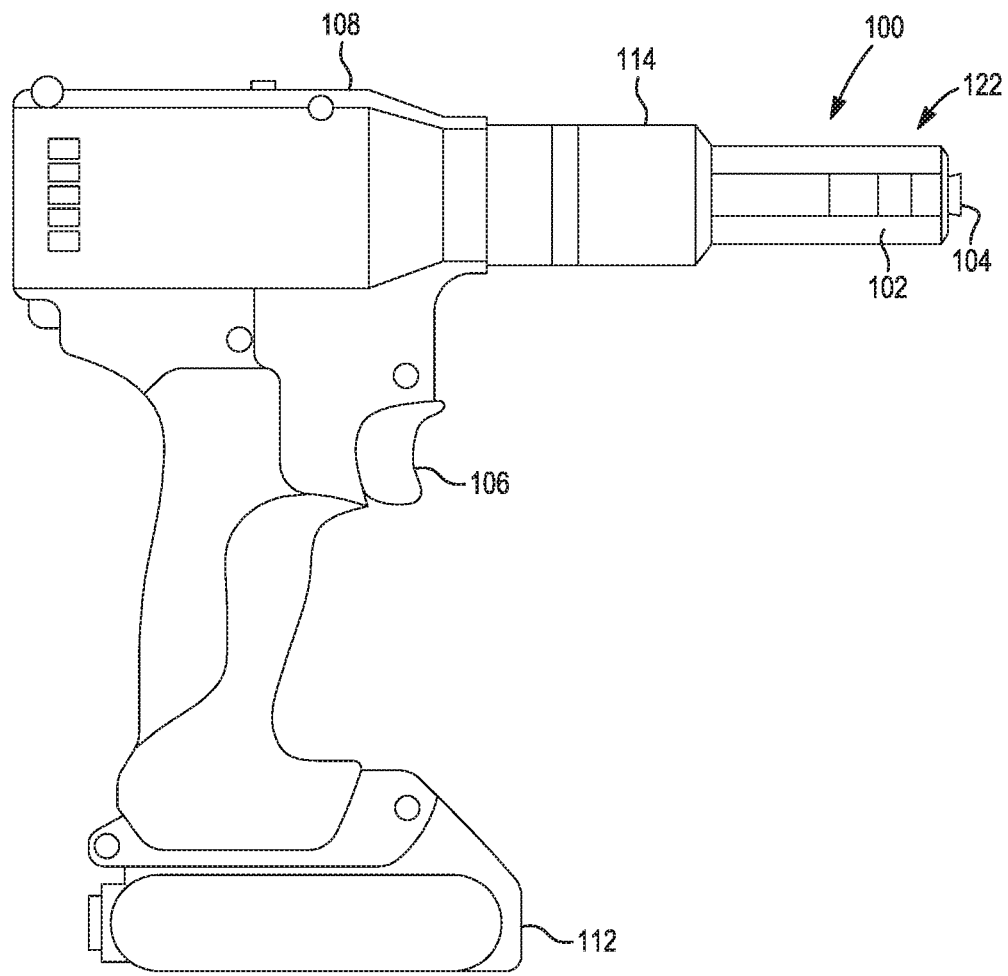
Figure 2:
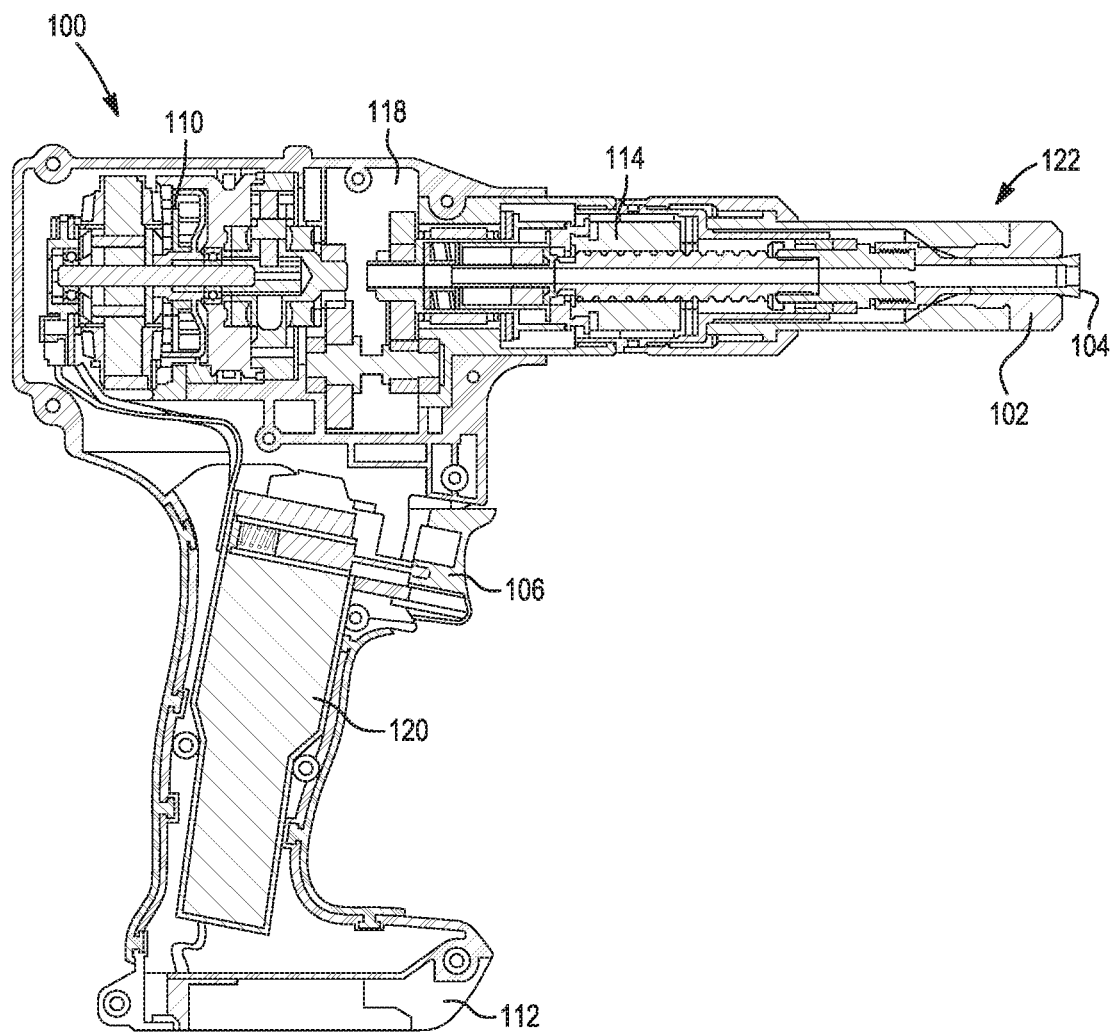
FIG. 2 is a cross-sectional view of the example tool of FIG. 1

Referring to FIGS. 1 and 2, a power tool 100 includes a housing 108, fastening mechanism 122, trigger system 106, transmission 118, motor 110, battery 112 and clutch control system 120. Power tool 100 may be similar to the power tool described in U.S. Pat. No. 9,193,055, the contents of which are hereby incorporated herein by reference.

As shown, transmission 118, motor 110 and clutch control system 120 are contained in housing 108. In one embodiment, the motor 110 is a brushless or electronically commutated motor, although the motor 110 may be another type of brushed DC or universal motor. An output shaft extends from the motor 110 to a transmission 118 that transmits power from the output shaft to a fastening mechanism 122. The power tool further includes trigger system 106 that includes a trigger mounted in housing 108 that permits a user to initiate or actuate motor 110.

In one embodiment, transmission 118 is a multi-speed transmission having a plurality of gears and settings that allow the speed reduction through the transmission to be changed, in a manner well understood to one of ordinary skill in the art. Transmission 118 may include a multi-stage planetary gear set, with each stage having an input sun gear, a plurality of planet gears meshed with the sun gears and pinned to a rotatable planet carrier, and a ring gear meshed with and surrounding the planet gears. For each stage, if a ring gear is rotationally fixed relative to the housing, the planet gears orbit the sun gear when the sun gear rotates, transferring power at a reduced speed to their planet carrier, thus causing a speed reduction through that stage. If a ring gear is allowed to rotate relative to the housing, then the sun gear causes the planet carrier to rotate at the same speed as the sun gear, causing no speed reduction through that stage. By varying which one or ones of the stages have the ring gears are fixed against rotation, one can control the total amount of speed reduction through the transmission, and thus adjust the speed setting of the transmission (e.g., among high, medium, and low). Other types of multi-speed transmissions can also be used.

In the example shown in FIGS. 1 and 2, power tool 100 has a fastening mechanism 122 that includes collet 104, anvil 102 and pulling mechanism 114. Collet 104 is a gripping portion of the fastening mechanism 122 that is connected to pulling mechanism 114. Collet 104 secures a fastener and pulls the fastener inward relative to the anvil 102 during use. In this manner, anvil 102 deforms a portion of the fastener in order to secure two work pieces together. It can be appreciated that fastening mechanism 122 can include other features and elements in connection with aspects of the present disclosure to secure various types of fasteners.

In the embodiment shown in FIGS. 1 and 2, power tool 100 is a handheld tool for use in connection with a fastener that undergoes permanent deformation to secure the fastener in position to a workpiece. More particularly, power tool 100 and the systems and methods of the present disclosure are suitable for use in connection with a deformable fastener that does not include a breakaway pin member. One example of such a fastener is a lockbolt sold under the trademark NEOBOLT®. Another example lockbolt is described in U.S. Patent Publication No. 2016/0215808, the contents of which are incorporated herein by reference.

Figure 3:
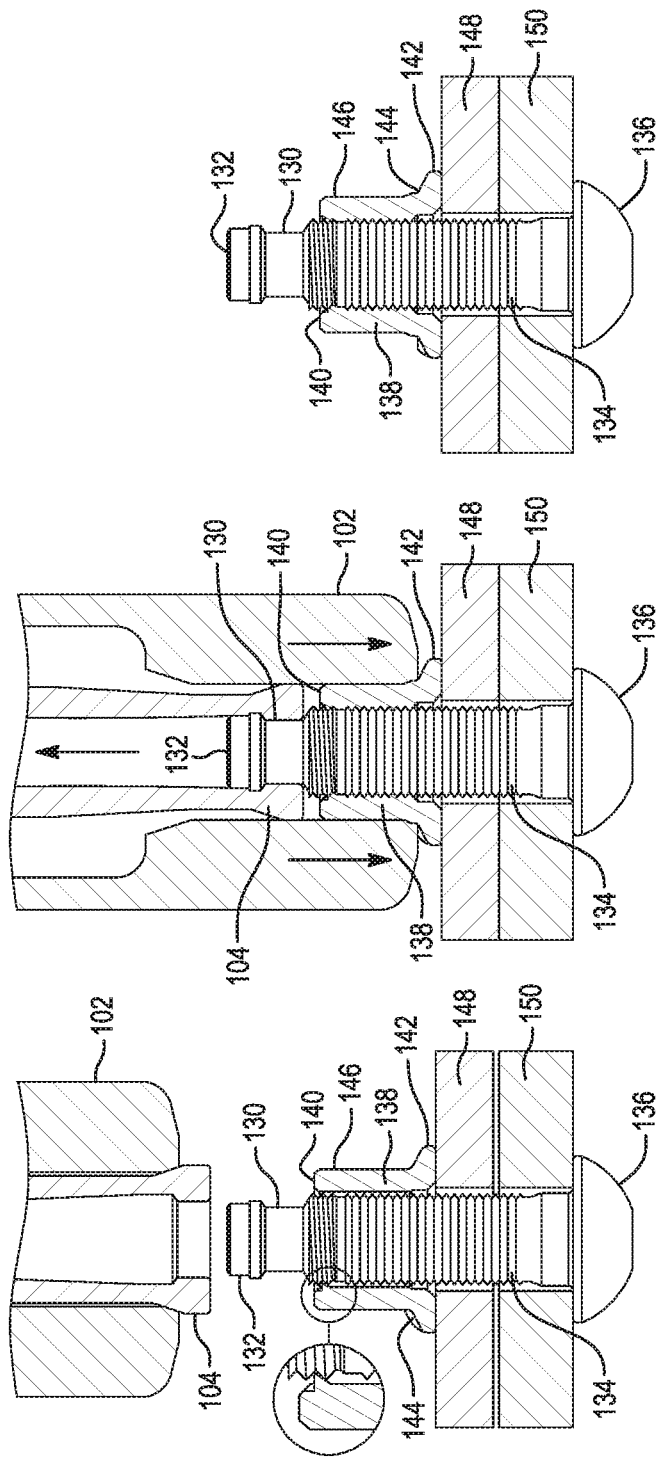
FIG. 3A is an illustration of an example fastener prior to engagement with a tool of present disclosure.
FIG. 3B is an illustration of the example fastener of FIG. 3A showing the tool engaging the fastener at the final stages of installation.
FIG. 3C is an illustration of the example fastener of FIG. 3A installed in a workpiece after the tool has been removed.

Referring now to FIG. 3, an example deformable fastener 130 is shown in various stages of installation. FIG. 3A depicts fastener 130 inserted into holes of first workpiece 148 and second workpiece 150. Fastener 130 includes head 136, pin 134, tail 132 and collar 138. Collar 138 is removable from pin 134 and is positioned over pin 134 during installation of the fastener. Collar 138 and head 136 are positioned on opposite sides of the workpieces and will retain the first workpiece relative to the second workpiece after the installation of fastener 130 is complete.

As further shown in FIG. 3A, collet 104 extends beyond anvil 102 of the power tool 100 prior to engaging fastener 130. In this manner, collet 104 is placed over tail 132 of fastener 130. Upon actuation of power tool 100, collet 104 grips fastener 130 and begins pulling fastener 130 inward relative to anvil 102. As shown in FIG. 3B, the inside diameter of the anvil 102 is smaller than the outer diameter of collar wall 146 of collar 138 such that anvil 102 deforms collar 138 and swages collar wall 146 into the threaded or grooved portion of pin 134. This deformation of collar 138 secures collar 138 relative to pin 134 to secure first workpiece 148 and second workpiece 150 together.

FIG. 3B illustrates a position of anvil 102 when power tool 100 is in its final stages of securing fastener 130. As shown, anvil 102 is positioned at or near corner 144 of collar 138. In this position, anvil 102 has swaged the length of collar wall 146. Upon reaching this position, the installation of fastener 130 is complete and collet 104 can extend back outward relative to anvil 102 and release the tail 132 of fastener 130. Upon completion of the installation, power tool 100 returns to its original or home position as shown in FIG. 3A. With the installation complete, the power tool 100 can be removed from the working position to leave the installed fastener 130 in the installed position as shown in FIG. 3C.

Figure 4:
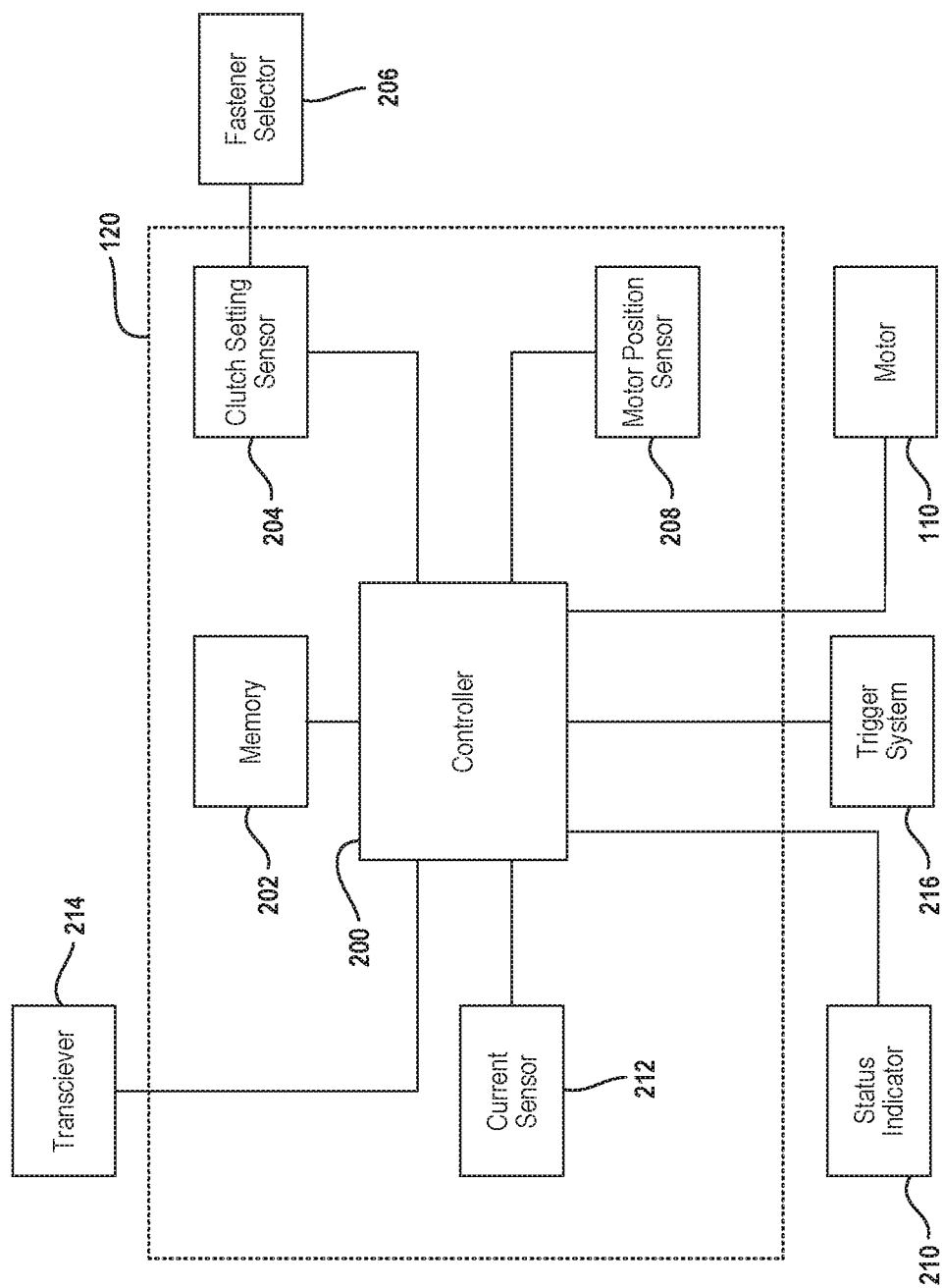
FIG. 4 is a block diagram of one example clutch control system of the present disclosure.

FIG. 4 illustrates one example clutch control system 120 of the present disclosure. In this example, clutch control system includes controller 200, memory 202, clutch setting sensor 204, motor position sensor 208 and current sensor 212. Clutch control system 120 is also connected to fastener selector 206, motor 110, trigger system 106, status indicator 210 and transceiver 214. In other examples, additional sensors may be included in clutch control system 120 as would be known to one of skill in the art.

In this example embodiment, clutch control system 120 is connected to clutch setting sensor 204. Clutch setting sensor 204 is, in turn, connected to fastener selector 206. Fastener selector 206 can be a toggle switch, push button, dial switch or other user input device through which a user can select one or more fastener characteristics. For example, power tool 100 can include a toggle switch mounted to housing 108 that permits a user to select an aluminum, steel, and/or standard or high strength fastener. Clutch setting sensor 204 receives such user provided information from fastener selector 206 such that certain parameters and operating conditions of clutch control system 120 are determined in accordance with a user's input.

Clutch control system also includes motor position sensor 208. Motor position sensor 208, in one example, includes one or more rotation sensors that sense changes in the angular position of the motor output shaft and provides a signal corresponding to the angular rotation, speed, and/or acceleration of the motor 110 to the controller 200.

In one embodiment, the motor position sensors 208 can be Hall sensors that are already part of a brushless motor. For example, the power tool 100 may include a three-phase brushless motor, where the rotor includes a four pole magnet, and there are three Hall sensors positioned at 120° intervals around the circumference of the rotor. As the rotor rotates, each Hall sensor senses when one of the poles of the four pole magnet passes over the Hall sensor. Thus, the Hall sensors can sense each time the rotor, and thus the output shaft, rotates by an increment of 60°. Motor position sensors 208 or controller 200 can use the signals from the Hall sensors to infer or calculate the amount of angular rotation, speed, and/or acceleration of the rotor. For example, the rotation sensing circuit includes a clock or counter that counts the amount of time or the number of counts between each 60° rotation of the rotor. Controller 200 can use this motor data to calculate or infer the amount of angular rotation, speed, and/or acceleration of the motor.

Clutch control system 120 also includes current sensor 212. Any suitable current sensor can be used. In one example, a shunt resistor can be used that senses the amount of current being delivered to the motor 110 and provides current data corresponding to the sensed current to the controller 200. The controller can then use the current data to determine when changes in current occur and calculate a rate of change in the amount of current being delivered to motor 110.

In the example shown in FIG. 4, clutch control system 120 is also connected to status indicator 210. Status indicator 210 is a device that can provide indications to a user about the operation of power tool 100. For example, status indicator 210 can be a light, speaker, vibration source, LCD screen or other indicator. As will be explained in more detail below, clutch control system 120 can send a signal to a user via status indicator 210 that a fastening operation is complete, that a fault has been detected or that any other condition of power tool 100 is present. This type of visual, audible or tactile feedback to a user is particularly advantageous to verify that a fastening operation is successfully completed.

Clutch control system 120 may also be connected to a transceiver 214. Transceiver 214 enables communication between clutch control system 120 and a communications network. Transceiver 214 can be any suitable communication device such as a Bluetooth transceiver, WiFi transceiver or cellular transceiver to enable wireless communications. In other embodiments, transceiver 214 can require power tool 100 to be connected to a desktop computer, laptop, smart phone or other processing device via a wired connection in order to send and receive information over a communications network.

Figure 5:
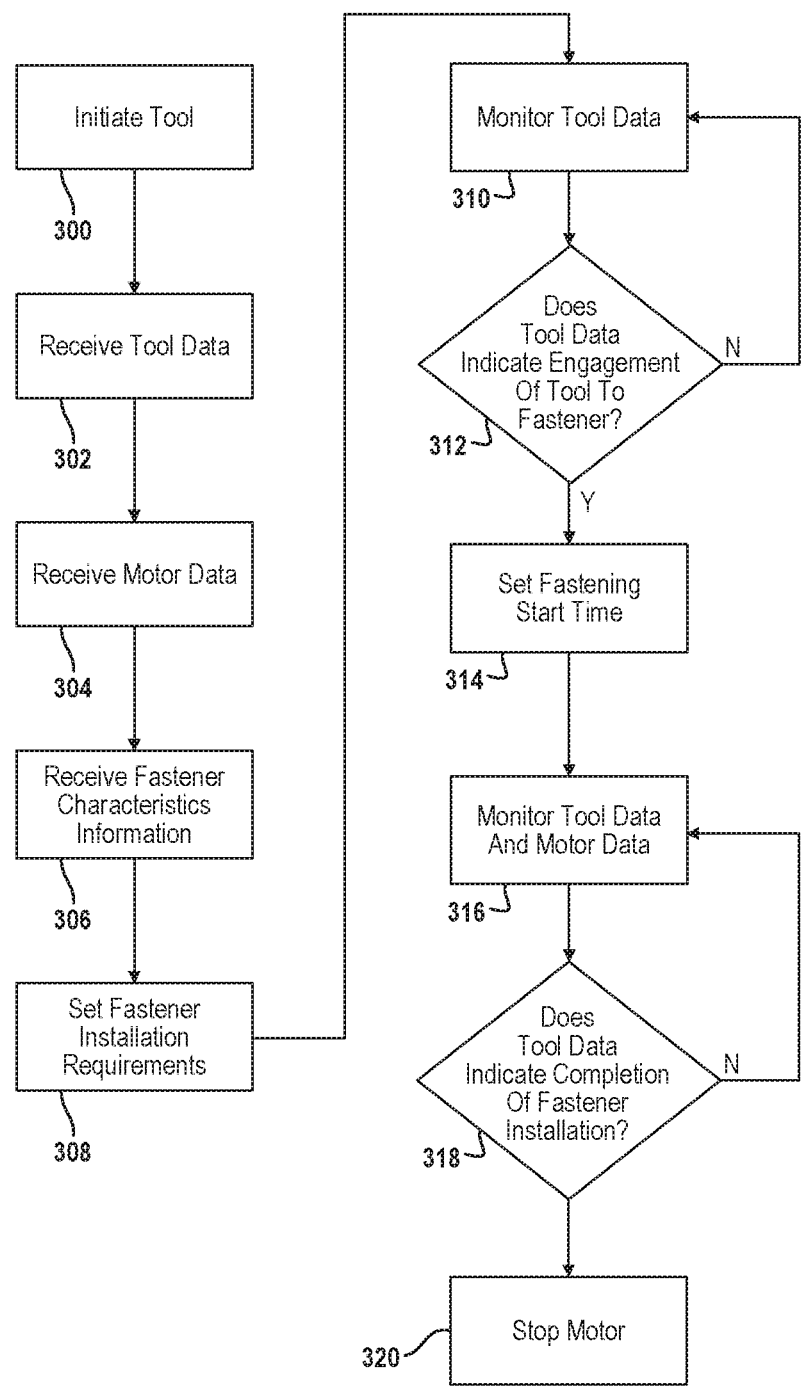
FIG. 5 is a flow chart of one example method of fastener installation of the present disclosure.

Referring to FIG. 5, an example method of installing a fastener is shown. For purposes of illustration, the example method is explained in the context of installation of a deformable fastener, such as lockbolt fastener 130. As can be appreciated, the steps, processing and methodology can be applied to other relevant fasteners as well. At step 300, a user initiates the tool. Tool 100 is initiated by depressing the trigger of the tool. Upon receiving an indication of this action, trigger system 106 can send a signal to controller 200 that, in turn, provides power to motor 110 that actuates tool 100. Upon initiation of tool 100, controller 200 begins receiving tool data at step 302. Tool data is information that describes operating conditions of the tool 100. Tool data can include current data, force (or load) data, proximity data or any other information collected by the various sensors and modules that may be included in tool 100 and connected to clutch control system 120. In the embodiment shown in FIG. 4, the tool data includes current data and current sensor 212 begins sending current data to controller 200 at step 302. In addition to receiving current data, controller 200 also begins receiving motor data from motor position sensor 208 at step 304.

Figure 7A:
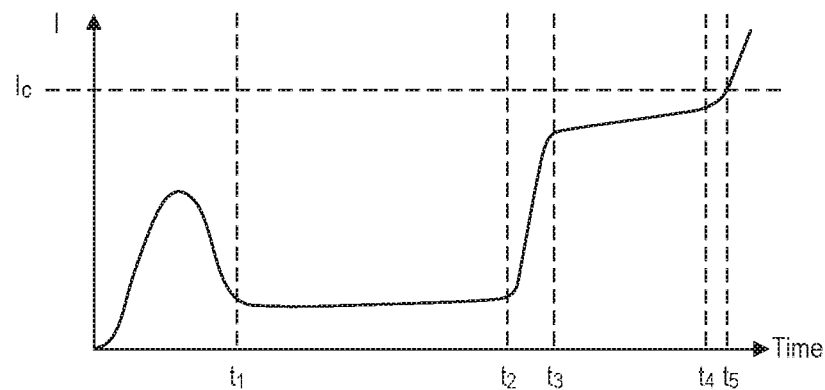
FIG. 7A is an illustration of the current used by a tool as a function of time associated with the installation of a fastener using the example method of FIG. 5.
Figure 7B:
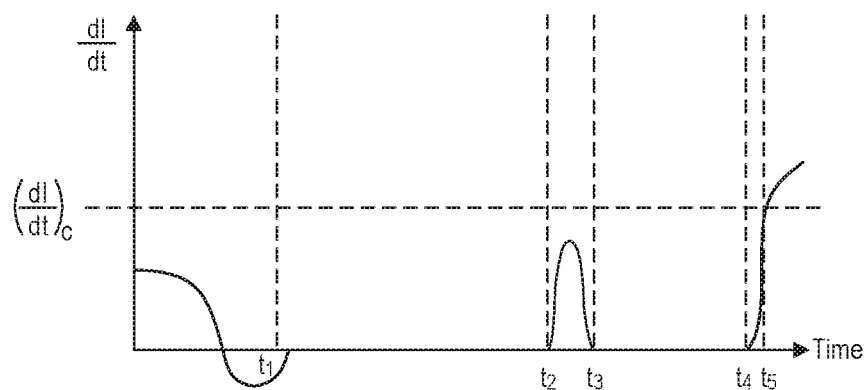
FIG. 7B is an illustration of the rate of change of the current used by a tool with the current profile shown in FIG. 7A.
Figure 7C:
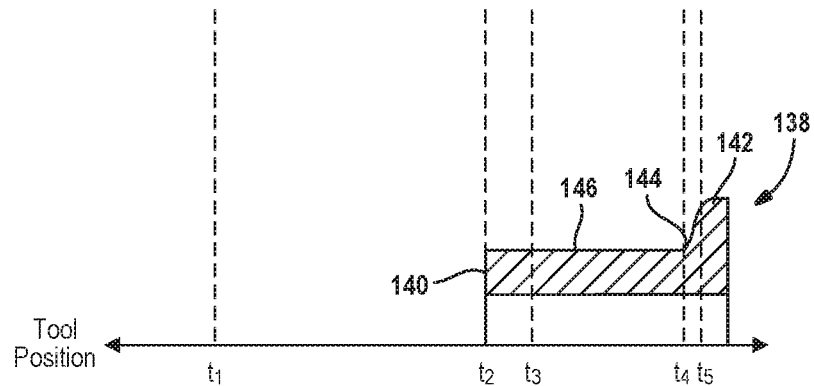
FIG. 7C is an illustration showing where on an example fastener the anvil would be positioned if the anvil were being driven by a motor using the current profile shown in FIG. 7A.

The current data that is received by controller 200 enables controller 200 to monitor changes and a rate of change of the current flowing to motor 110. FIGS. 7A and 7B illustrate a graphical representation of the current data being received by controller 200. At t=0, tool 100 is initiated. FIG. 7A illustrates current I, as it changes over time after the initiation of tool 100. FIG. 7B illustrates the rate of change of current over time, or dI/dt, after the initiation of tool 100. FIG. 7C shows a profile of the example collar 138 and illustrates a position of the anvil 102 of tool 100 on the example collar 138 of fastener 130 over time after the initiation of tool 100.

The current profiles shown in FIGS. 7A, 7B begin at the initiation of tool 100. The next time that is indicated on the figures is $t_1$. Time $t_1$ indicates the time at which the initial in-rush of current has ended and tool 100 has begun drawing fastener 130 into tool 100 toward anvil 102. As can be seen, during this stage, current I is substantially constant until reaching time $t_2$.

At time $t_2$, anvil 102 begins to contact collar 138 at initiation end 140. As this occurs, anvil 102 begins to swage collar 138. This action creates a higher load on motor 110 that translates to the increase in current I shown in FIG. 7A between time $t_2$ and $t_3$. After this sharp upward rise in current I, anvil 102 continues swaging collar 138 during the time period between $t_3$ and $t_4$. Current I continues to slightly increase over time during this period due to the increased surface area of collar 138 being located in anvil 102. At time $t_4$, anvil 102 begins to contact corner 144 of collar 138. As this occurs, current I again spikes upward as anvil 102 meets flange 142 of collar 138. At time $t_5$, current I and the rate of change of current dI/dt have met current thresholds Ic and (dI/dt)c as will explained in further detail below. At this position (at time $t_5$), the swaging of collar 138 is complete.

Referring back to FIG. 5, controller 200 receives fastener characteristics information at step 306. Fastener characteristics information is data or information that describes one or more properties of a fastener. For example, fastener characteristics information may include a length of the fastener, a diameter of the fastener, the fastener's material, the fastener's hardness or grade or other information that describes or is relevant to the forces or time required to properly secure the fastener in a desired position. The fastener characteristics information can be input into tool 100 through fastener selector 206 or it can be automatically determined by controller 200.

In one embodiment of tool 100, fastener selector 206 is a dial mounted on housing 108. A user is able to choose a desired type of fastener. The dial fastener selector can include options such as steel, aluminum, high strength or standard. A user is able to select the type of fastener. Controller 200 receives an indication of the selection from clutch setting sensor 204. One or more tables or databases of information can be stored in memory 202 that includes various other properties of a fastener that correspond to the fastener that is selected on fastener selector 206. For example, after receiving information from clutch setting sensor 204 that a steel fastener has been selected, controller 200 can retrieve fastener characteristics information such as the length of collar 138 and fastener installation requirements (e.g., current thresholds) from memory 202.

In another embodiment of tool 100, the type of fastener is automatically determined by controller 200. As previously described, the profiles of current I and the rate of change of current dI/dt between $t_2$ and $t_3$ corresponds to a time when anvil 102 begins contacting collar 138. These profiles of current I and the rate of change dI/dt are different between various types of fasteners. Controller 200 can analyze the profiles of current I and the rate of change of current dI/dt during this period and compare the profiles to known profiles and/or known current values, such as the amplitude of current I at time $t_3$ or the maximum rate of change of current dI/dt. If the profiles match a known profile, controller 200 can automatically determine a type of fastener such as the material of the fastener or whether the fastener is high strength or standard grade. Upon the determination of the type fastener, various other fastener characteristics information can be retrieved from memory 202 as previously described.

For example, a user may engage tool 100 to a fastener 130 and initiate the tool by depressing the trigger. Upon initiation of tool 100, collet 104 grips fastener 130 and begins pulling fastener 130 into anvil 102. When the initiation end 140 of fastener 130 contacts anvil 102, the tool data being received by controller 200 sees the current I spike upwards as shown in FIG. 7A at time $t_2$. The controller 200 also sees the parabolic shaped profile of the rate of change of current dI/dt as shown in FIG. 7B between times $t_2$ and $t_3$. Since the amplitude of the spike I will be greater for steel fasteners than for aluminum fasteners and the local maximum of the rate of change of current dI/dt will be greater for steel fasteners than for aluminum fasteners, controller 200 can differentiate between the steel and aluminum fastener by comparing the current data between time $t_2$ and $t_3$ to known current thresholds or other current profile characteristics. Controller 200 can have the current thresholds or other current profile characteristics stored in memory 202 that indicate the characteristics of the current profiles for steel fasteners and aluminum fasteners. As can be appreciated, the same process can be used to automatically differentiate between standard and high strength grade fasteners or between other types of fasteners that exhibit a unique current profile upon engagement of the fastener by the tool 100.

Whether the type of fastener is input by a user using fastener selector 206 or is determined automatically by controller 200, controller 200 sets fastener installation requirements at step 308. Fastener installation requirements are thresholds or other measurable parameters that controller 200 will use to determine when various stages of the fastening process have occurred. These events can correspond to the start of a fastening process, the end of the fastening process or to an interim engagement or deformation of the fastener. Controller 200 compares the data and information that it is receiving from various sensors in tool 100 to the fastener installation requirements to determine when these events occur.

In one example, the fastener installation requirements include current thresholds. Controller 200 sets current thresholds that correspond to current levels that controller 200 will use to determine when the swaging of collar 138 begins, when the swaging process is complete and whether the fastener has been installed properly or if a fault has occurred during installation. The current thresholds may include one or more thresholds of current I and one or more current thresholds of the rate of change of current dI/dt.

For example, a current threshold may be set that corresponds to (or is slightly less than) a current value of current I that occurs at time $t_3$. A current threshold may also be set for the rate of change of current dI/dt at or near the value of dI/dt that occurs at time $t_3$. These engagement current thresholds (not shown on FIG. 7A or 7B) can be used by controller 200 to determine when the tool 100 has engaged the fastener as will be explained further below. Similarly, controller 200 may set completion current thresholds that controller 200 will use to determine when the installation process is complete. As indicated on FIGS. 7A and 7B, completion current threshold Ic and completion rate of change of current threshold (dI/dt)c have been set by controller 200 in this example. As shown, current I and rate of change of current dI/dt meet these thresholds at time $t_5$ indicating that the swaging process is complete.

As can be appreciated, controller 200 may set other fastener installation requirements to determine when other stages of the fastening process have occurred. In addition, other thresholds or parameters can be used in addition to or in place of current thresholds in examples of clutch control systems that are connected to other sensors. For example, proximity sensors, voltage sensors or other sensors may be used to determine when the engagement of a fastener has occurred.

Referring back to FIG. 5, controller 200 monitors the tool data during tool operation at step 310. Controller 200 continues to receive tool data that includes current data from current sensor 212 and monitors the data. At step 312, controller 200 compares the current data to the fastener installation requirements (e.g., engagement current thresholds) to determine when the anvil 102 engages collar 138. As previously explained, controller 200 can determine that anvil 102 engages collar 138 when controller 200 observes that current I exceeds an engagement current threshold or exceeds an engagement rate of change of current threshold. If the tool data indicates that the tool 100 has engaged a fastener, processing continues at step 314. If not, controller 200 continues to monitor the tool data at step 310.

At step 314, controller 200 sets a fastening start time. The fastening start time corresponds to time $t_2$. This is when the anvil 102 engages collar 138 and begins to swage collar 138. By setting the fastening start time, controller 200 will be able to determine the travel of anvil 102 relative to collar 138 to verify whether the entire collar 138 has been secured in position.

At step 316, controller 200 monitors the tool data and motor data. Controller 200 receives motor data from motor position sensor 208. At step 318, controller 200 then compares the tool data to the fastener installation requirements to determine completion of the fastening process. As previously stated, controller 200 may set a completion current threshold and a completion rate of change of current threshold, Ic and (dI/dt)c, respectively. Controller compares the current data included in the tool data, in this example, to current thresholds Ic and (dI/dt)c. Controller 200 determines whether the current or the rate of change of current exceeds these thresholds. If the current and the rate of change of current do not exceed current thresholds Ic and (dI/dt)c, controller 200 continues to monitor the current data and the motor data at step 316. If the current and the rate of change of current exceed the current thresholds Ic and (dI/dt)c, controller 200 stops the motor at step 320. Controller 200 may stop the motor by interrupting power to the motor 110.

In another embodiment, completion of the fastening process is determined soley by monitoring the number of motor rotations and comparing the number of motor rotations to a number (or range) of rotations needed to ensure proper installation of the fastener. Once the number of motor rotations exceeds the predetermine number or falls in the range of rotations, the controller stops the motor. In this embodiment, the rate of change in current could be used as a secondary check. For instance, when the number of motor rotations exceeds the predetermined threshold and the rate of change of current exceeds the completion rate of change of current threshold, the fastener installation is deemed successful. On the other hand, when the number of motor rotations exceeds the predetermined threshold but the rate of change of current did not reach the completion rate of change of current threshold, the fastener installation is presumed successful but the tool operator is advised to visually inspect the fastener.

Figure 6:
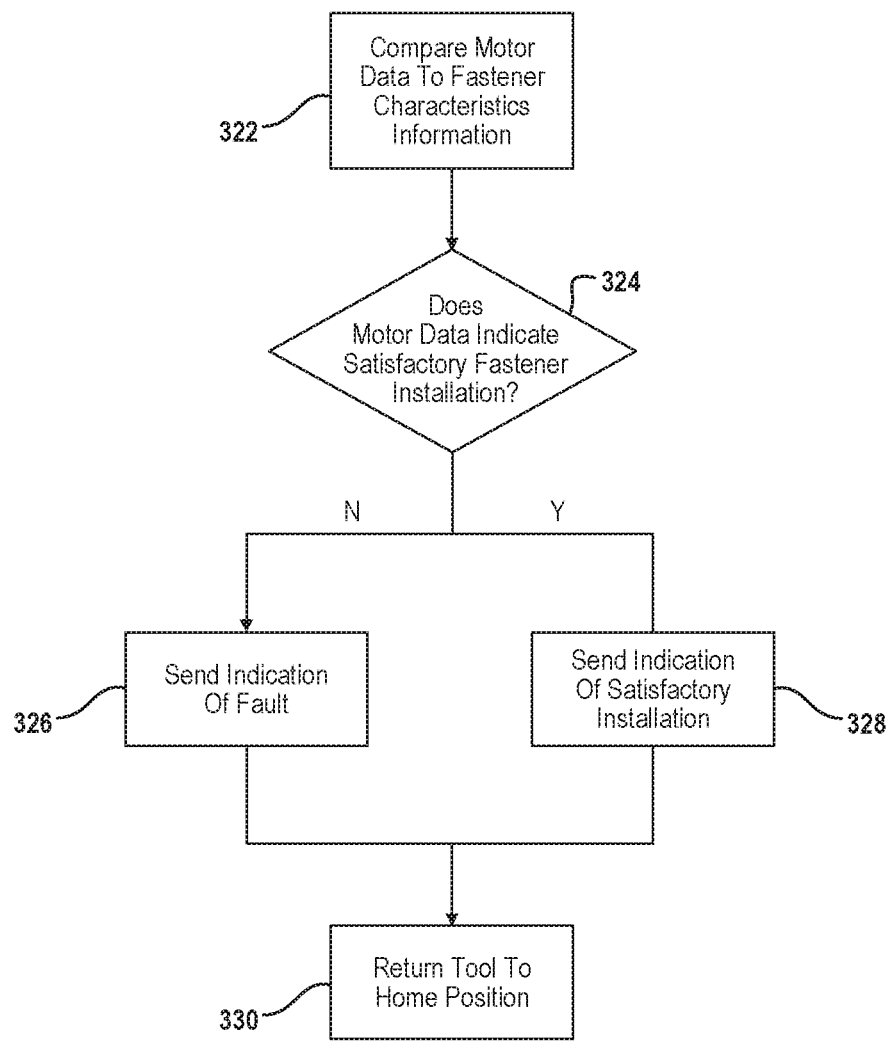
FIG. 6 is a flow chart of one example method of installation verification of the present disclosure.

At this stage, the installation of fastener 130, in this example, is effectively complete. Clutch control system 120, however, may also include the ability to verify the installation of the fastener. FIG. 6 illustrates an example method of the verification of the installation of the fastener. The example method begins after the previously described fastener installation steps have been completed.

Referring now to FIG. 6, the method of verification begins at step 322. If the tool has performed properly during the fastener installation described in FIG. 5, the anvil 102 has swaged the entire wall of collar 138 and is positioned at or near corner 144. As previously described, the contact of anvil 102 to flange 142 at or near corner 144 would cause the spike in current I and in the rate of change of current dI/dt as shown in FIGS. 7A and 7B at time $t_5$. At step 322, controller 200 compares the motor data to the fastener characteristics information in order to verify whether the anvil is in the proper position and collar 138 has been sufficiently swaged. Controller 200 is able to use the motor data that it has received from motor position sensor 208 (e.g., rotary encoder) to determine the number of rotations of motor 110 from the fastening start time (i.e., time $t_2$) until the current has exceeded the completion current thresholds (i.e., time $t_5$). The controller 200 determines, based on the fastener characteristics information, the length of collar 38. Given the length of collar 38, the controller 200 can determine a number of rotations of motor 110 needed to properly swage the fastener. It is envisioned that this information can be in the stored fastener characteristics information or it can be calculated by controller 200.

Controller 200 compares the motor data (i.e., number of motor rotations) to the required number (or range) of rotations needed to ensure proper installation of the fastener. If the motor data indicates that the number of motor rotations falls within a predetermined range, the anvil 102 has swaged a sufficient length of collar 138 such that it is securely fastened in position. If the motor data indicates that the number of motor rotations is less than the predetermined range, the anvil 102 has not swaged a sufficient length of collar 138. If the motor data indicates that the number of motor rotations is more than the predetermined range, the tool has performed other than as anticipated and the fastener should be inspected to determine that it has been sufficiently secured in position. For example, for one type of lockbolt and one example tool 100, it can be anticipated that motor 110 should turn between 80 to 100 times in order for anvil 102 to swage the length of collar 138 between initiation end 140 and corner 144. At step 322, controller 200 compares the number of motor rotations between time $t_2$ to time $t_5$ to the designate range. If the motor data indicates that motor 110 turned 92 times, then a satisfactory fastening process has been completed. If the motor data indicates that motor 110 turned 78 times or 103 times, a fault has occurred. In one embodiment, processing continues at step 324. In an alternative embodiment, if the motor data indicates that the motor turned less than the lower bound of the designated range (e.g., 78), the controller continues to drive the motor until the motor data indicates that the motor rotations fall within the designated range. In this way, the tool disregards the current metrics that swaging of the fastener is complete and overcomes potential false readings to ensure proper installation of the fastener.

At step 324, controller determines whether a satisfactory fastener installation has occurred. If the motor data indicates satisfactory completion, controller 200 sends instructions to status indicator 210 to emit a signal to the user of satisfactory completion at step 328. If the motor data does not indicate satisfactory completion, controller 200 sends instructions to status indicator 210 to emit a signal to the user of a fault at step 326. Status indicator 210 can emit a signal of successful completion or of a fault by displaying a light, displaying a message, emitting an audible signal, vibrating tool 100 or via any other suitable method to the user. Alternatively or additionally, an indicator for the quality of the installation can be transmitted by a transceiver (e.g., RF or cellular transceiver) in the tool over a wireless network to a remote monitoring station.

At step 330, controller 200 returns tool 100 to the home position. At the home position, the fastener 130 is released from collet 104. At this stage, a user can move to a second fastener if desired or inspect the fastener if a fault signal was emitted by tool 100.

The foregoing described method of verifying the installation of fastener can detect various types of faults or problems that may have occurred during the installation of a fastener. For example, if a lockbolt does not have sufficient lubrication or has not been hardened properly, controller 200 can detect that collar 138 has not been completely swaged and secured in position. Such indication of fault would be emitted by tool 100 and a visual inspection of the lockbolt could indicate the incomplete fastening process.

Another type of example fault that could be detected by controller 200 is a circumstance where the tail 132 of fastener 130 breaks (either prematurely or otherwise) during the fastening process. If the tail 132 of fastener 130 breaks during the installation process, the current data would not exhibit a profile as that shown in FIG. 7A or 7B. The breakage could manifest itself into a sudden drop in current or an unanticipated spike in the rate of change of current during the swaging process in the period between time $t_3$ to time $t_4$. In one example, a sudden drop in current can be determined by comparing the change in measured current during a single sampling period to a threshold. Similarly, a spike in the rate of change of current can be determined by comparing a change in the rate of change during one or more sampling periods to a threshold. Controller 308 can set fastener installation requirements or retrieve pre-set fastener installation requirements that correspond to variations to the anticipated current profiles. Such unanticipated variations from the anticipated current profiles can be detected by controller 200 and an indication of a fault would be emitted by tool 100.

Additional protective features can be incorporated into the fastener installation process. For example, a secondary current threshold (e.g., $I_c$ in FIG. 7A) can be implemented during the installation process. If at any time before the anvil contacts the collar (i.e., $t_4$) or the swaging in completed (i.e., $t_5$) the measured current exceeds the secondary current threshold, the load is assume to be larger than needed to install the fastener and the motor is stopped and/or the returned to a home position. This condition may occur when a tool component is broken, the fastener is mis-aligned, a faulty fastener or some other fault conditions. In this way, the tool and the fastener are protected against potential damage.

Still further, controller 200 can detect other faults as well, such as, breakage of collet 104, material mismatches wherein a collar and a pin of a lockbolt are incompatible and wear or breakage of anvil 102. These types of faults also would exhibit unanticipated changes, spikes in current I or in the rate of change of current dI/dt. Controller 200 can set fastener installation requirements or retrieve pre-set fastener installation requirements that correspond to these failures. As can be appreciated, fastener installation requirements can also be set for other types of tool data such as the data collected from proximity sensors, voltage sensors or other sensors than may be connected to clutch control system 120.

The systems and methods of the present disclosure can also be applied to various types of fasteners and fasteners of various grades and materials. The systems and methods are useful for use in connected with deformable fasteners such as lockbolts, rivets and popnuts. The fasteners, such as lockbolts, can be made of various metals including steel and aluminum and can be made of various grades and hardness. As can be appreciated, the foregoing system and method can be used to install and verify lockbolts of both steel and aluminum and of standard to high strength grades. The current profiles of different materials would have different amplitudes and may exhibit different shapes but the current thresholds of the present disclosure, including both thresholds of current I and of the rate of change of current dI/dt, can be used according to the previously described methods. If we consider the profiles shown in FIGS. 7A and 7B to be profiles for an aluminum lockbolt, the current profiles for a steel lockbolt would look similar but would have higher current amplitudes that result from the higher loads required to swage a steel collar as compared to an aluminum collar. The same relative situation is the case if the current profiles of a standard lockbolt are compared with a high strength grade lockbolt of the same material.

While not shown in FIG. 5, tool 100 may store identification data and fastener status data in memory 202 upon completion of a fastening cycle. The identification data can assign a unique number to each installed fastener and the fastener status data can include whether satisfactory completion or a fault was determined at steps 328 and 330. This information can be particularly useful if a project is being completed that requires a multitude of fasteners to be installed. The identification data and the fastener status data can be retained as evidence of completion of the projection or can be used to identify the cause of failures that may later occur in a secured joint. Still further, faulty fasteners and faulty joints can be identified for inspection and repair. The identification data and fastener status data can be stored in memory 202 for later use or can be transmitted via transceiver 214 to report status in real-time or for storage in other storage devices.

In one example embodiment, the identification data and/or fastener status data or elements thereof are displayed or otherwise visually represented to a user. The identification data and/or fastener status data can be displayed via the status indicator 210 in the form of a series of colored lights or on an LCD screen. In other examples, the identification data and/or fastener data can be transmitted to a mobile computing device and displayed to the user. As can be appreciated, other items of information and data previously described can also be stored, retrieved, transmitted or displayed. On examples of tool 100 with a LCD screen status indicator 210, the LCD may display, for example, that a user just successfully installed a #6 fastener of high strength aluminum.

Spatial and functional relationships between elements (for example, between modules, sensors, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

In this application, including the definitions below, the term "controller" or the term "module" may be replaced with the term "circuit." The term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The controller may include one or more interface circuits. In some examples, the interface circuits may include wired or wireless interfaces that are connected to a local area network (LAN), the Internet, a wide area network (WAN), or combinations thereof. The functionality of any given controller of the present disclosure may be distributed among multiple modules that are connected via interface circuits. For example, multiple controllers may allow load balancing. In a further example, a server (also known as remote, or cloud) controller may accomplish some functionality on behalf of a client module.

The computer programs that may implement the functionality described in this disclosure include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Numerous modifications may be made to the exemplary implementations described above. These and other implementations are within the scope of this application.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power tool, comprising:
   a housing;
   a fastening mechanism at least partially contained in the housing, wherein the fastening mechanism includes:
   a drivable sliding sleeve with an anvil, and
   a collet configured to grip a deformable fastener and move the fastener in relation to the anvil, thereby performing a swaging operation;
   a motor arranged in the housing and drivably connected to the fastening mechanism;
   a current sensor configured to measure of current supplied to the motor of the power tool during operation of the power tool; and
   a controller configured to receive a measure of current from the current sensor and determine a rate of change of the current during operation of the power tool, wherein the controller determines occurrence of the power tool engaging a fastener based on the magnitude of the current supplied to the motor, determines occurrence of the power tool swaging the fastener based on the rate of change of the current, and determines completion of the power tool swaging the fastener based on the magnitude of the current and the rate of change of the current;
   wherein the controller is interfaced with the motor and alters rotation of the motor of the power tool in response to determining completion of swaging the fastener.

2. The power tool of claim 1 wherein the controller determines occurrence of the power tool engaging the fastener by comparing the magnitude of the current to a first current threshold.

3. The power tool of claim 2 wherein the controller determines occurrence of the power tool swaging the fastener by comparing magnitude of the rate of change of the current to a first rate of change threshold.

4. The power tool of claim 3 wherein the controller determines completion of the power tool swaging by comparing the magnitude of the current to a second current threshold and comparing magnitude of the rate of change of the current to a second rate of change threshold, where the second current threshold is larger than the first current threshold and the second rate of change threshold is larger than the first rate of change threshold.

5. The power tool of claim 1 wherein the controller alters rotation of the motor by one of reversing rotation of the motor or stopping rotation of the motor.

6. The power tool of claim 1 wherein the controller verifies quality of the installation of the fastener using the determination of the occurrence of the power tool engaging the fastener and the determination of the completion of the power tool swaging the fastener; and generates an indicator for the quality of the installation of the fastener.

7. The power tool of claim 6 wherein the controller verifies quality of the installation of the fastener by determining a distance traversed by the sliding sleeve during swaging of the fastener, comparing the distance traversed by the sliding sleeve to known dimensions of the fastener, and generates the indicator for the quality of the installation of the fastener based on the comparison.

8. The power tool of claim 1 wherein the controller detects a failure in the installation of the fastener in response to a sudden drop in magnitude of the current or a sudden increase the rate of change of the current during swaging of the fastener.

9. The power tool of claim 1 wherein the fastener includes a stem having threads formed along a portion thereof and a collar that encircles the stem, such that the swaging operation deforms the collar of the fastener and swages the collar into the threads formed along the stem.

10. The power tool of claim 9 wherein the collet extends through the sliding sleeve and pulls the fastener inward and into the sliding sleeve, such that an inner diameter of the anvil is smaller than outer diameter of the collar.

11. A power tool, comprising:
    a housing;
    a fastening mechanism at least partially contained in the housing, wherein the fastening mechanism includes:
    a drivable sliding sleeve with an anvil, and
    a collet configured to grip a deformable fastener and move the fastener in relation to the anvil, thereby performing a swaging operation;
    a motor arranged in the housing and drivably connected to the fastening mechanism;
    a current sensor configured to measure of current supplied to the motor of the power tool during operation of the power tool; and
    a controller configured to receive a measure of current from the current sensor during operation of the power tool and determine rate of change of the current during operation of the power tool, wherein the controller determines occurrence of the power tool engaging the fastener based on the magnitude of the current supplied to the motor, determines occurrence of the power tool swaging the fastener based on the rate of change of the current, and determines completion of the power tool swaging the fastener based on the magnitude of the current and the rate of change of the current;
    wherein the controller further operates to verify quality of the installation of the fastener using the determination of the occurrence of the power tool engaging the fastener and the determination of the completion of the power tool swaging the fastener, and generates an indicator for the quality of the installation of the fastener.

12. The power tool of claim 11 wherein the controller determines occurrence of the power tool engaging the fastener by comparing the magnitude of the current to a first current threshold.

13. The power tool of claim 12 wherein the controller determines occurrence of the power tool swaging the fastener by comparing magnitude of the rate of change of the current to a first rate of change threshold.

14. The power tool of claim 13 wherein the controller determines completion of the power tool swaging by comparing the magnitude of the current to a second current threshold and comparing magnitude of the rate of change of the current to a second rate of change threshold, where the second current threshold is larger than the first current threshold and the second rate of change threshold is larger than the first rate of change threshold.

15. The power tool of claim 11 wherein the controller alters rotation of the motor by one of reversing rotation of the motor or stopping rotation of the motor.

16. The power tool method of claim 11 wherein the controller verifies quality of the installation of the fastener by determining a distance traversed by the sliding sleeve during swaging of the fastener, comparing the distance traversed by the sliding sleeve to known dimensions of the fastener, and generating the indicator for the quality of the installation of the fastener based on the comparison.

17. The power tool method of claim 16 wherein the controller presenting the indicator for the quality of the installation of the fastener to a tool operator or transmitting the indicator for the quality of the installation of the fastener via a transceiver over a wireless network.

18. The method of claim 11 wherein the controller detects a failure in the installation of the fastener in response to a sudden drop in magnitude of the current or a sudden increase the rate of change of the current during swaging of the fastener.

19. The power tool of claim 11 wherein the fastener includes a stem having threads formed along a portion thereof and a collar that encircles the stem, such that the swaging operation deforms the collar of the fastener and swages the collar into the threads formed along the stem.

* * * * *